(No Model.)
O. J. MERRITT.
ANIMAL DESTROYER.
No. 605,890.
Patented June 21, 1898.
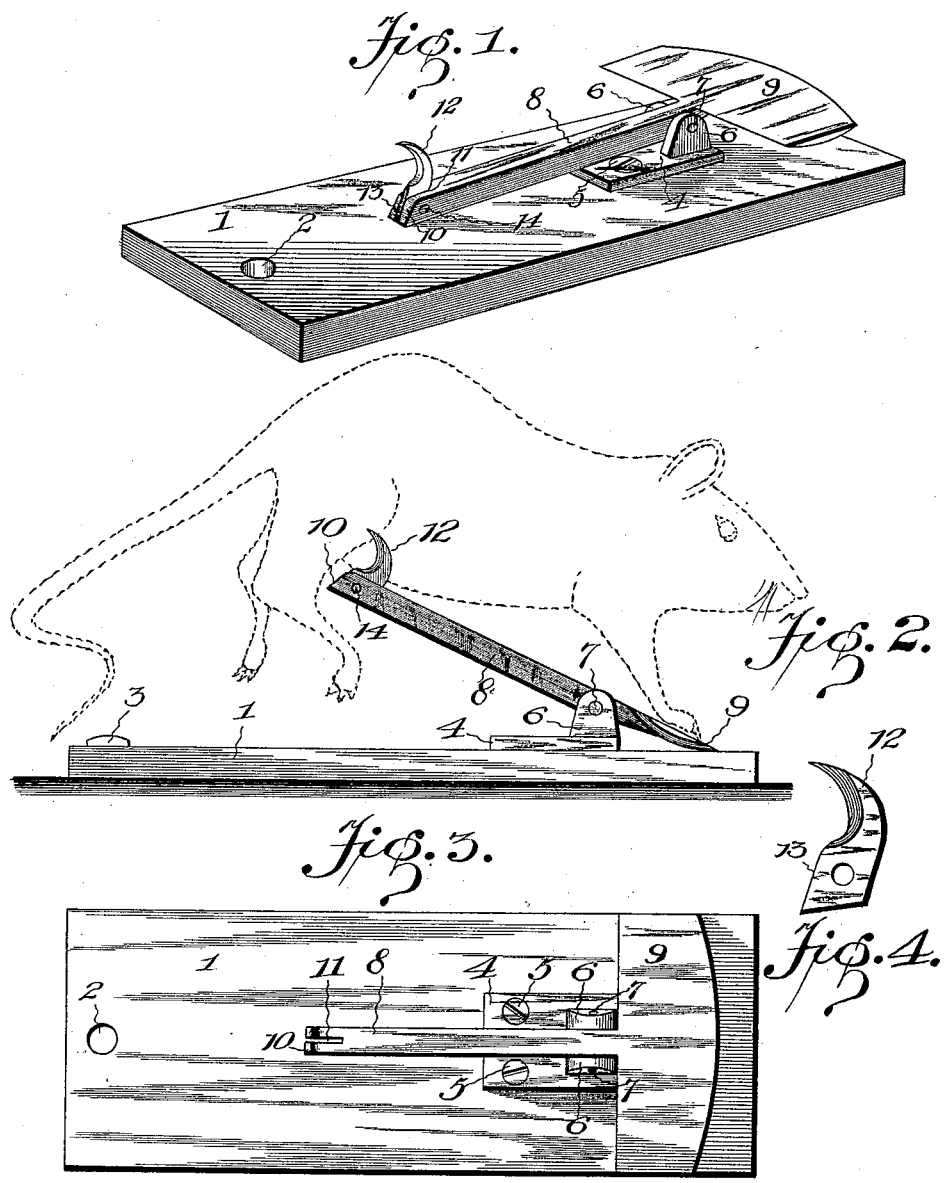
Witnesses
A. Roy Appleman
Edwin Cruse.
By his Attorneys,
Inventor
Otis J. Merritt.
C. A. Snow & Co.

UNITED STATES PATENT OFFICE.

OTIS J. MERRITT, OF SENEAGUOTEEN, IDAHO, ASSIGNOR OF ONE-HALF TO ANDREW A. MERRITT, OF SAME PLACE.

ANIMAL-DESTROYER.

SPECIFICATION forming part of Letters Patent No. 605,890, dated June 21, 1898.

Application filed December 13, 1897. Serial No. 661,688. (No model.)

*To all whom it may concern:*

Be it known that I, OTIS J. MERRITT, a citizen of the United States, residing at Seneaguoteen, in the county of Kootenai and State of Idaho, have invented a new and useful Animal-Destroyer, of which the following is a specification.

This invention relates to animal-destroyers especially designed to destroy animals that burrow in the ground.

The object of the invention is to provide a simple and efficient device of this character adapted to be placed in the burrow formed by the animal and so constructed that the animal in passing over it will throw a sharp blade into such position that the destroyer will disembowel the animal in passing over and as soon as the animal has passed the blade will resume its normal position and be ready for the next animal.

With this object in view the invention consists of the several details of construction and combination of parts, as will be hereinafter fully described, and particularly pointed out in the claims.

In the drawings, Figure 1 is a perspective view of an animal-destroyer made in accordance with my invention. Fig. 2 is a side elevation of the same, showing the blade in its elevated position in contact with the animal. Fig. 3 is a plan view of the device, the blade being detached from the lever. Fig. 4 is a view of the blade detached.

Similar reference-numerals indicate similar parts in the several figures.

1 indicates the base, which may be of wood or metal, as preferred, and is provided with an opening 2 near one end for the reception of a pin or spike 3, by means of which it may be secured in position. The base will preferably be oblong in order that it may be inserted a sufficient distance into the hole or burrow and be secured by the pin or spike near the entrance. A plate 4 is secured to the base near its other end by screws 5 or other suitable fastening devices, and this plate is provided with upwardly-extended spaced ears 6, which are perforated for the reception of a pin 7, which serves as a pivot for the lever 8, which fits between said ears. One end of the lever is provided with an integral plate portion 9, which forms a treadle and is of substantially the same width as the base. The other end of the lever is beveled, as indicated by 10, and is also provided with a vertically-disposed slot 11, the end wall of which will preferably be inclined to be parallel with the beveled end of the lever.

12 indicates a curved blade having the plate portion 13, which forms a shank and is adapted to fit snugly in the slot 11 and be secured therein by a pin 14 or other suitable fastening means. As shown, the blade is curved and provided with a sharp point and a knife-edge on the inner side of the curve, and the point projects beyond the plane of the beveled end of the lever.

As illustrated in the drawings, the device is intended to be inserted into the hole or burrow with the treadle in advance, so that the animal will be disemboweled when it goes into its hole; but it is obvious that the parts could be reversed to disembowel the animal when leaving the hole.

The device will be inserted in the hole and secured by the pin 3, and when the animal enters the hole it will tread on the treadle and elevate the blade and the point of the blade will enter the abdomen, and as the animal moves forward the blade will rip it open and disembowel the animal. As this will not immediately kill the animal, it will pull itself off the knife, and as the knife end of the lever overbalances the treadle the said end will drop back on the base and the device will be ready for operation on another animal.

It will be understood that changes in the form, proportion, and the minor details of construction may be resorted to without departing from the spirit or sacrificing any of the advantages of this invention.

Having thus described the invention, what I claim is—

1. In an animal-destroyer, the combination of a base, a lever pivotally supported intermediate of its ends, a blade carried by one arm of the lever, and a treadle mounted on the other arm of the lever and adapted to be depressed by an animal, whereby the blade will be thrown upward and disembowel said animal, substantially as described.

2. In an animal-destroyer, the combination of a base, a lever pivotally supported intermediate its ends on said base, a treadle on one end of the lever, a curved and pointed blade on the opposite end, the blade end of the lever being normally depressed, and means to secure the base in position, substantially as described.

3. In an animal-destroyer, the combination of an oblong base, a plate secured to the base and having upwardly-extending spaced ears, a lever pivoted intermediate its ends between said ears, a treadle on one end of the lever, a curved blade secured to the other end of the lever, said blade being pointed and having a knife-edge on the inside of the curve, the end of the lever carrying the blade being normally depressed, and means to secure the base in position, substantially as described.

In testimony that I claim the foregoing as my own I have hereto affixed my signature in the presence of two witnesses.

OTIS J. MERRITT.

Witnesses:
    JAMES H. HARTE,
    FRANK O. HILL.